C. H. DANE.
EQUALIZING DEVICE FOR SPIROMETERS.
APPLICATION FILED OCT. 22, 1920.

1,407,841.

Patented Feb. 28, 1922.
2 SHEETS—SHEET 1.

INVENTOR
Christian H. Dane
BY HIS ATTORNEYS

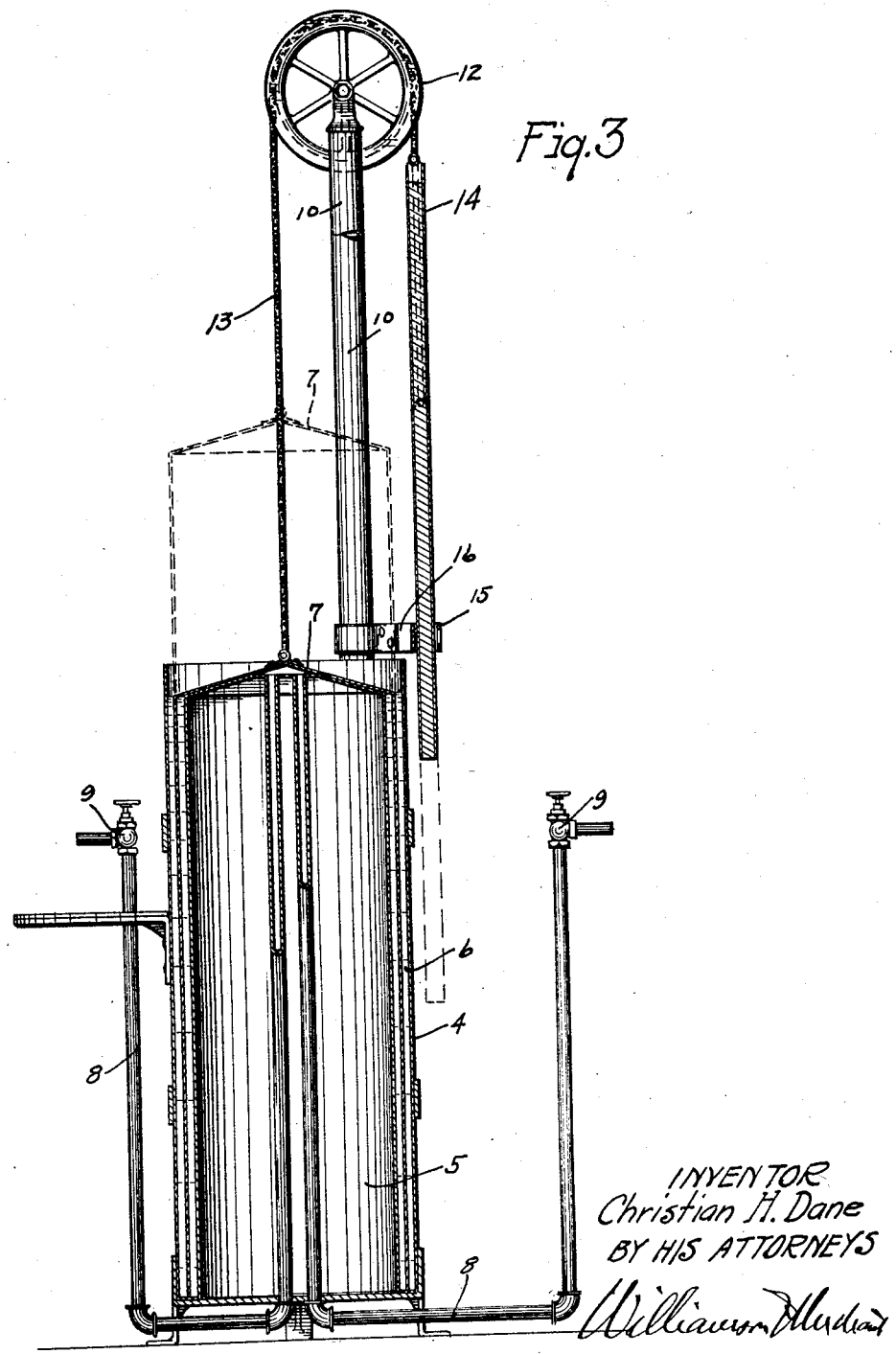

UNITED STATES PATENT OFFICE.

CHRISTIAN H. DANE, OF MINNEAPOLIS, MINNESOTA.

EQUALIZING DEVICE FOR SPIROMETERS.

1,407,841. Specification of Letters Patent. Patented Feb. 28, 1922.

Application filed October 22, 1920. Serial No. 418,753.

*To all whom it may concern:*

Be it known that I, CHRISTIAN H. DANE, a citizen of the United States, residing at Minneapolis, in the county of Hennepin and State of Minnesota, have invented certain new and useful Improvements in Equalizing Devices for Spirometers; and I do hereby declare the following to be a full, clear, and exact description of the invention, such as will enable others skilled in the art to which it appertains to make and use the same.

My invention has been directed particularly to the provision of a spirometer, the bell or movable element of which is preferably balanced so that air or gas contained therein will always be under the same pressure, regardless of the volume of gas contained in this spirometer; but from a broad point of view, it provides means for perfecting the balance of the bells or movable elements of that type of expansible gas and air containing apparatus generally designated as gasometers.

Generally stated, the invention consists of the novel construction and combination of parts hereinafter described and defined in the claims.

Hitherto, it has been common practice, in part, to support or counterbalance the bells of spirometers and other gasometers by a counterweight connected to the bell by a cable (towit, either a chain, cord, wire, or the like) passed over a sheave or guide wheel, but in all of such arrangements, so far as I am aware, there has been an increasing or variable pressure on the air or gas, under varying volume thereof, within the gasometer. This has been due to the fact that the bell of the gasometer, in moving upward, will displace less and less of the sealing liquid, and in moving downward, will displace more and more thereof, and to the fact that the counter-balancing connections have not been so related to this water displacement as to maintain constant or nearly constant pressure on the air or gas contained within the gasometer.

Spirometers, as is well known, are used to measure the volume of air exhaled from the lungs of a human being and in order to measure the volume thereof accurately, it is of the utmost importance that the exhaled air being measured as to volume be kept accurately under constant pressure, for otherwise, the measurement as to volume will not be accurate.

My invention provides very simple inexpensive and efficient means for very accurately counterbalancing the bell of the spirometer or gasometer for all vertical positions thereof, so that the air therein contained and being measured, as to volume, will be kept under exactly the same or constant pressure.

My invention, as applied to a spirometer, is illustrated in the accompanying drawings wherein like characters indicate like parts throughout the several views.

Referring to the drawings:

Fig. 3 is a vertical section taken on the line 3—3 of Fig. 1, some parts being shown in full.

Figure 1:
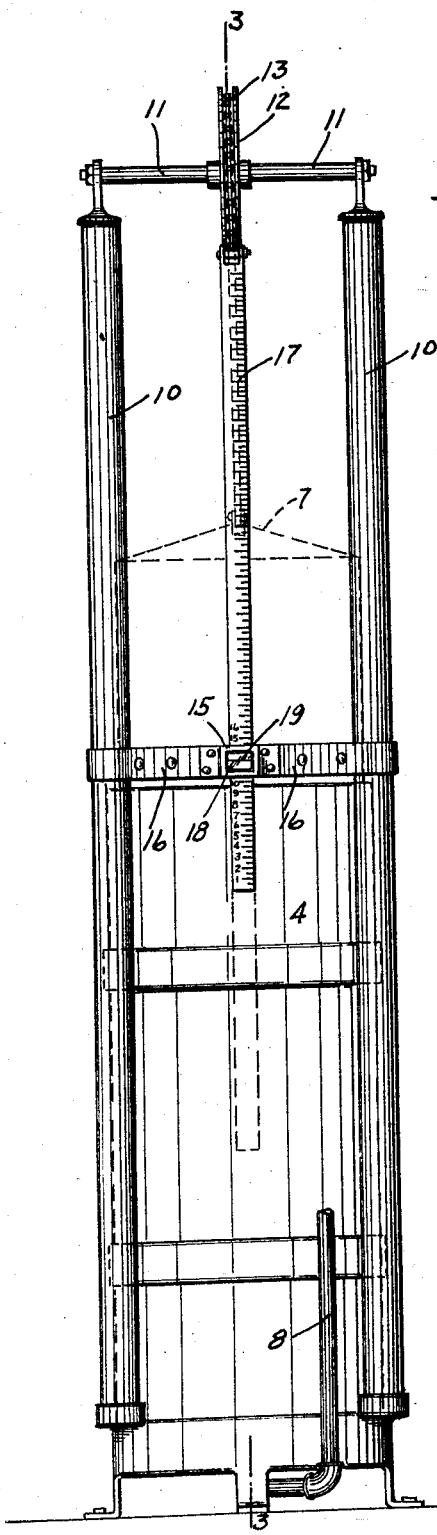
Fig. 1 is a front elevation of the spirometer;
Figure 2:
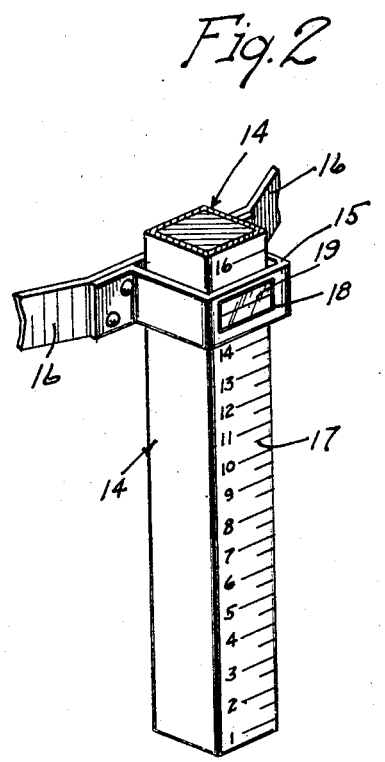
Fig. 2 is a detail in perspective, showing the counterweight with its graduated scale and a co-operating keeper with a scale pointer.

Of the parts of the spirometer, the numeral 4 indicates the outer tank which is open at its top and the numeral 5 indicates the inner core-forming shell, closed both at top and bottom, and secured within the outer shell 4 concentric thereto so as to afford an annular sealing chamber that contains the sealing liquid 6. The numeral 7 indicates the bell or vertically movable shell which is closed at its top and works with its depending portion immersed to a greater or less extent within the sealing liquid 6. The sealing liquid will usually be water.

The numeral 8 indicates air pipes which lead upward through the inner shell 5, and at their upper ends open into the space between the top of said shell 5 and the top of the bell 7, in such manner that when the bell is dropped to its limit, there is but very slight air containing capacity between said elements 5 and 7. The air pipes 8 are shown as provided with valves 9 so that either of said pipes may be used as an air intake pipe and the other as a discharge pipe. The construction so far described is that of an ordinary spirometer.

The numeral 10 indicates a pair of columns secured to and projecting upward from the outer shell 4 and connected at their upper ends by a fixed spindle 11 on which a sheave or grooved wheel 12 is journaled for very free rotation by means of ball bearings, or the like, not shown. The numeral 13 indicates a cable, as shown, preferably in the form of a chain attached at one end to the top of the bell 7, passed over the sheave 12, and provided at its other end with a counterweight 14. This counterweight 14 is preferably a hollow rectangular tube adapted to be very accurately adjusted as to weight, either by pouring molten lead or shot into the same. As shown, this counterweight 14 works freely through a keeper bracket 15 secured to a cross bar 16 that is connected to the intermediate portions of the columns 10.

The outer face of the counterweight 14 is utilized as a scale, and hence, is graduated at 17 to indicate the volume contents of the space between the shell 5 and bell 7, for different vertical positions of the latter. Preferably, this scale 17 indicates the contents of the spirometer in cubic centimeters.

The outer portion of the keeper brackets 15 is cut away at 18 to afford a sight opening, and the scale pointer in the form of a small wire or line 19 secured to said bracket and extended across the scale to thereby make very accurate reading of the scale possible.

We now come to the consideration of the very important and novel relative relation of the parts whereby the objects above set forth are accomplished. In the first place, it should be stated that the chain or cable 13 is accurately so weighted that a certain length thereof will weigh exactly one-half as much as the water displaced by the bell in moving vertically the distance of such length of chain. To illustrate, specifically, if the spirometer bell, in moving downward, displaces one-half pound of water for each foot of downward movement, then each lineal foot of the chain or cable 13 should weigh exactly one-fourth of a pound. This one-half weight relation between the cable and the water displacement is due to the fact that when one-half pound of cable is moved from the left hand or gasometer side of the sheave to the right hand or counterweight side of said sheave, it subtracts its weight from the gasometer side and adds its weight to the counterweight side.

The weight of the counterweight 14 must be such that it, with the cable 13, will exactly counterbalance the bell 7 in all positions of the latter when said bell is raised and is subject to exactly the same pressure from the air or gas contained in the gasometer, and if this is true in respect to one position, it will remain true in respect to all positions thereof, because of the above noted relation of the cable, in respect to the water displacement of the spirometer bell. A good way of accomplishing this result is to force the gasometer bell down to its limit, as shown in Fig. 3, so as to expel the air therefrom, and while leaving the same subject to internal and external atmospheric pressure, to adjust the weight 14 so that it, with the cable, will exactly counterbalance the effective weight of the bell when immersed to its limit. If the cable were to be of such length that, in the position just noted, there was an equal amount of cable on both sides of the sheave, then the weight of the counterweight should be equal to the absolute weight of the bell minus the weight of the maximum water displacement thereof. If, however, the cable is shorter than above just assumed, then the weight of the weight 14 should equal the absolute weight of the bell minus the maximum water displacement thereof, plus the weight of the cable that is on the bell side of the sheave in excess of that that is on the weight side of said sheave. If, on the other hand, when the gasometer bell is lowered to its extreme, as stated, the weighted end of the cable is longer than the bell end thereof, then the weight 14 should equal the absolute weight of the bell 7 minus the maximum water displacement thereof, minus the weight of the chain that is on the weight side of the sheave in excess of that that is on the bell side of said cable. When the above noted relation of parts has been established, air or gas introduced into the spirometer or gasometer will always be under exactly the same or constant pressure, regardless of the volume thereof and regardless of the resulting different vertical positions of the bell, and hence, air in the spirometer or gasometer may be accurately measured as to volume.

The above described apparatus or gasometer has been designed and put into actual use as a spirometer and has been found very accurate and highly satisfactory for various different clinics and hospitals. However, as above indicated, the apparatus can be put to much more extensive use.

As above indicated, the term "gasometer" is herein used in a broad and generic sense to include not only spirometers but other expansible gas or air containing apparatus. Obviously, the sheave or cable guiding wheel operates as a continuous lever acting guide which carries the cable from one side to the other of the pivot or fulcrum and, of course, if the movement of the gasometer bell is very short, this element would not need to be a complete sheave or wheel.

What I claim is:

1. The combination with a gasometer having a movable bell, of a counterbalancing device for said bell comprising a cable guiding wheel and a weighted cable passed over said wheel and connected to said bell, the weight of said cable, per lineal unit of distance, being one-half of the weight of the water displaced by said bell when moved the same vertical distance.

2. The combination with a gasometer having a movable bell, of a counterbalancing device for said bell comprising a cable guiding wheel, and a cable passed over said wheel, connected at one end to said bell and provided at its other end with a counterweight, the weight of said cable per lineal unit of distance being one-half the weight of the water displaced by said bell when moved the same vertical distance, and the said cable and weight, for all vertical positions of said bell counterbalancing the same against a constant internal pressure of air or gas.

3. The combination with a gasometer having a movable bell, of a counterbalancing device for said bell comprising a cable guiding wheel, and a cable passed over said wheel, connected at one end to said bell and provided at its other end with a counterweight, the weight of said cable per lineal unit of distance being one-half the weight of the water displaced by said bell when moved the same vertical distance, and the said cable and weight, for all vertical positions of said bell counterbalancing the same against a constant internal pressure of air or gas, said counterweight being graduated to indicate volume contents of said gasometer for different positions of the bell thereof, and a fixed pointer co-operating with said scale.

In testimony whereof I affix my signature.

CHRISTIAN H. DANE.